United States Patent [19]
Miyanari

[11] Patent Number: 6,029,010
[45] Date of Patent: Feb. 22, 2000

[54] OPTICAL UNIT CONTROLLER

[75] Inventor: Hiroshi Miyanari, Hachiohji, Japan

[73] Assignee: Canon Kabushiki Kaisha, Tokyo, Japan

[21] Appl. No.: 08/993,142

[22] Filed: Dec. 18, 1997

Related U.S. Application Data

[63] Continuation of application No. 08/277,572, Jul. 20, 1994, abandoned.

[30] Foreign Application Priority Data

Jul. 23, 1993  [JP]  Japan .................................. 5-202071

[51] Int. Cl.⁷ ............................ G03B 13/36; G05B 19/29
[52] U.S. Cl. ............................ 396/90; 396/133; 318/603; 318/685
[58] Field of Search ............................ 396/90, 133–136, 396/85–87; 359/697; 318/603, 626, 600, 685

[56] References Cited

U.S. PATENT DOCUMENTS 5,175,577   12/1992   Shinozaki et al. ..................... 396/90

Primary Examiner—W. B. Perkey
Attorney, Agent, or Firm—Fitzpatrick, Cella, Harper & Scinto

[57] ABSTRACT

A camera, an optical apparatus or an optical unit controller having a device for driving an optical unit, a device for determining a state of movement of the optical unit, and a control unit for changing the direction of movement of the optical unit according to whether the amount of driving necessary for the driving device to move the optical unit to a position at which the determination device determines the state of movement of the optical unit is equal to or smaller than a predetermined amount.

31 Claims, 6 Drawing Sheets

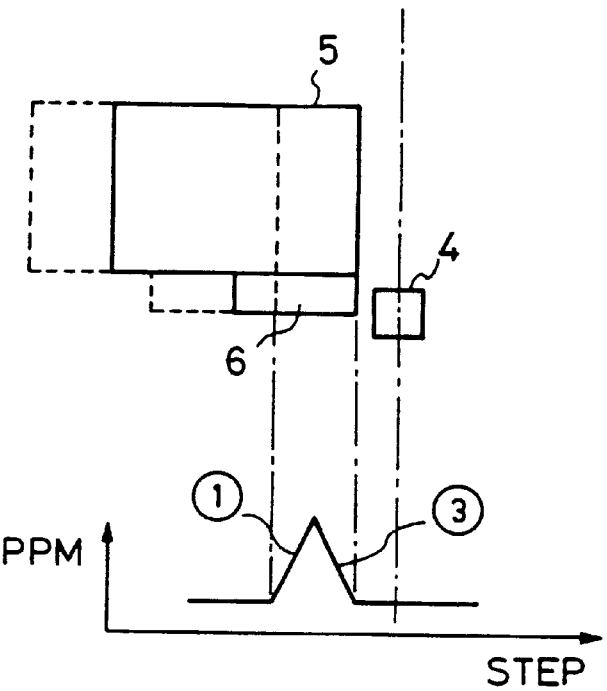
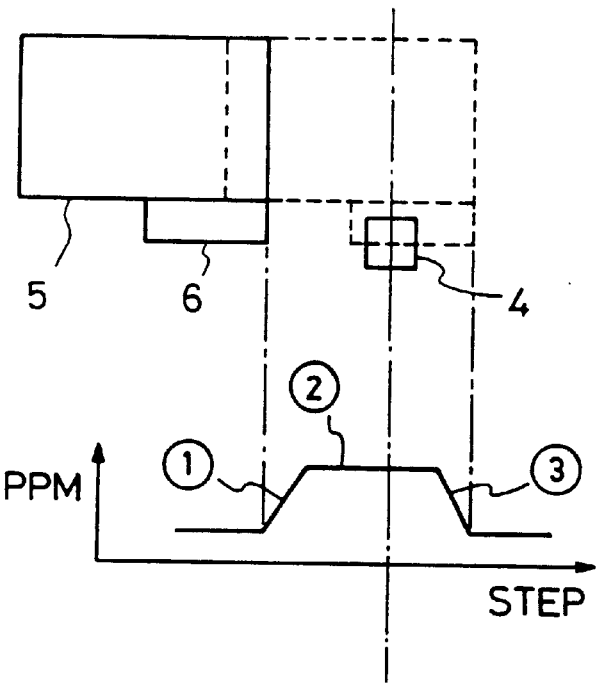

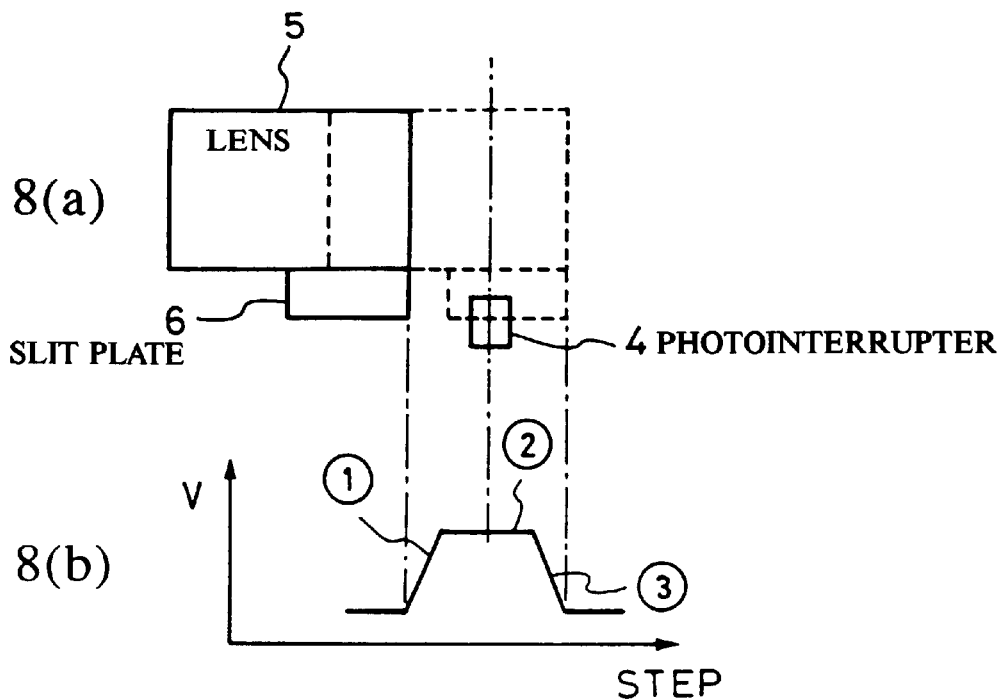
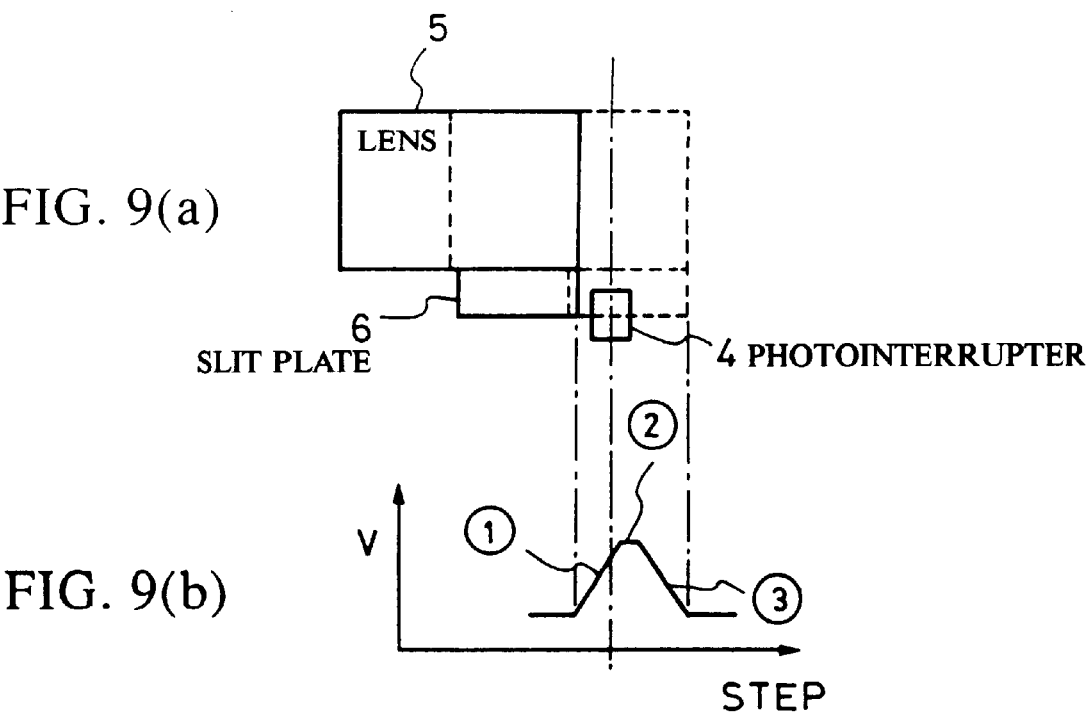

OPTICAL UNIT CONTROLLER

This application is a continuation of application Ser. No. 08,277,572 filed Jul. 20, 1994, now abandoned.

BACKGROUND OF THE INVENTION

1. Field of the Invention

This invention relates to an optical unit controller suitable for controlling the driving of an optical unit using a motor, particularly such as a stepping motor.

2. Description of the Related Art

FIG. 5 shows the arrangement of the major portions of a camera using a stepping motor as a focusing actuator.

In FIG. 5 are illustrated a CPU 1 for performing control and operational processing of a camera operation sequence, a motor drive circuit 2 for driving a stepping motor 3, a photointerrupter 4 for detecting the position of a focusing lens 5 through a slit plate 6, the slit plate 6 fixed to the focusing lens 5, a switch 7a which is turned on by a first half stroke of a shutter release button to start photographing preparation operations (photometry and distance-measuring operations), a release switch 7b which is turned on by a second half stroke of the shutter release button to start a photographing operation (exposure operation), and a distance measuring circuit 8 for measuring the distance to an object to be photographed. The distance measuring circuit 8 has light emitting and receiving devices (not shown) such as an infrared ray emitting diode and a position sensitive device.

In this arrangement, the focusing lens 5 is normally set in an initial position. In this state, when the shutter release button is moved through its first half stroke to turn on the switch 7a, the CPU 1 drives the distance measuring circuit 8 to obtain distance measurement information, calculates the amount of driving of the focusing lens 5 from the distance measurement result, and drives the stepping motor 3 by the calculated driving amount through the motor drive circuit 2 to move the focusing lens 5 to a desired position.

Thereafter, when the release switch 7b is turned on by the second half stroke of the release button, the CPU 1 performs an exposure operation by shutter control. After the completion of the exposure operation, the focusing lens 5 is returned to the initial position. That is, the CPU 1 drives the stepping motor 3 a certain number of steps in the opposite direction through the motor drive circuit 2 to set the focusing lens 5 in the initial position (initial position setting).

For this initial position setting, the stepping motor 3 is driven a certain number of steps and then stopped, after the detection of an edge of the slit plate 6 by the photointerrupter 4.

FIGS. 6(a) and 6(b) comprise a diagram showing an example of drive patterns in a case where the stepping motor 3 is a two-phase motor.

In FIG. 6(a), the relationship between the number of steps (time) and the speed is shown, which is represented by three patterns, i.e., an acceleration pattern ①, a constant speed pattern ②, and a deceleration pattern ③. In FIG. 6(b), the relationship between time and phases is shown.

In the time period corresponding to the acceleration pattern ①, phase change time intervals are gradually reduced to gradually accelerate the rotation of the stepping motor 3. This is because if the pattern ① is a drive pattern of abruptly accelerating the rotation of the stepping motor 3, the stepping motor 3 cannot rotate rapidly enough to follow the pattern. In the time period corresponding to the constant speed pattern ②, the phases are changed at equal time intervals, since the stepping motor 3 is in such a state as to be able to rotate so as to follow a high-speed-rotation drive pattern. In the time period corresponding to the deceleration pattern ③, phase change time intervals are gradually increased to gradually decelerate the rotation of the stepping motor 3, since if the pattern ③ is a drive pattern of abruptly stopping the rotation of the stepping motor 3, the stepping motor 3 cannot follow such a pattern because of an inertial effect, as in the case of the acceleration pattern ①.

As is apparent from the above, the numbers of steps for the acceleration pattern ① and the deceleration pattern ③ are substantially equal to each other, and these numbers of steps (length of each pattern) are previously determined by the performance of the stepping motor 3.

The operation of setting the focusing lens 5 in the initial position by driving the above-described stepping motor 3 will be described with reference to FIGS. 7 through 9.

FIG. 7 shows the relationship between the positions of the photointerrupter 4 and the slit plate 6 when the focusing lens 5 is in the initial position.

If the focusing lens 5 is in a position such as shown in FIG. 8(a) when the exposure operation is completed, and if the focusing lens 5 is returned from this position to the initial position indicated by the broken lines in FIG. 8(a) (i.e., the position shown in FIG. 7), the relationship between the number of steps and the speed is as shown in FIG. 8(a).

In this case, as shown in FIG. 8(b), an initial position detection time when a right end edge of the slit plate 6 passes the photointerruptor 4, that is, the state of the photointerrupter is changed from "bright" to "dark" is in the period of the constant speed pattern ②.

If, as in this case, the time when the initial position is detected by the photointerrupter 4 is in the period of the constant speed pattern ②, the initial position detection time and the stepping motor 3 are in an in-phase relationship with each other. That is, the initial position detection time and the phase of the stepping motor 3 in setting the focusing lens 5 in the initial position are in phase with each other, as long as no step-out occurs.

However, if the position of the focusing lens 5 at the time when the exposure operation is completed is in the vicinity of the initial position, for example, as shown in FIG. 9(a), and if the focusing lens 5 is returned from this position to the initial position indicated by the broken lines in FIG. 9(a), the initial position detection time when the state of the photointerrupter 4 is changed from "bright" to "dark" will be in the period of the acceleration pattern ①.

If as in this case the initial position detection time is in the period of the acceleration pattern ①, the initial position detection time and the phase of the stepping motor 3 in setting the focusing lens 5 in the initial position vary due to a lag of the rotational speed of the stepping motor 3 with respect to the phase of the input to the motor 3, a lag of transmission of the rotation of the motor 3, for example, caused by a backlash of gears, and other factors, resulting in failure to accurately set the focusing lens 5 in the initial position.

SUMMARY OF THE INVENTION

According to one aspect of the present invention there is provided a camera, an optical apparatus or an optical unit drive-controller having means for driving an optical unit, means for determining a state of movement of the optical unit, and control means for changing the direction of movement of the optical unit according to whether the amount of driving necessary for the drive means to move the optical unit to a position at which the determination means determines the state of movement of the optical unit is equal to or smaller than a predetermined amount.

The features of the present invention in other aspects will become apparent from the following detailed description of a preferred embodiment of the invention.

BRIEF DESCRIPTION OF THE DRAWINGS

FIG. 2(a) is a diagram of an operation of setting the focusing lens shown in FIG. 1 in an initial position;

FIG. 2(b) is a curve showing the relationship between the number of drive steps and motor speed for the operation shown in FIG. 2(a);

FIG. 3(a) is a diagram of an operation of setting the focusing lens shown in FIG. 1 in an initial position;

FIG. 3(b) is a curve showing the relationship between the number of drive steps and motor speed for the operation shown in FIG. 2(a);

FIG. 8(a) is a diagram of an operation of returning the focusing lens from a forwardly-moved position to the initial position;

FIG. 8(b) is a curve showing the relationship between the number of drive steps and motor speed for the operation shown in FIG. 8(a);

FIG. 9(a) is a diagram for explanation of the problem of the conventional art with respect to a movement of a focusing lens from a forwardly-moved position to the initial position.

FIG. 9(b) is a curve showing the relationship between the number of drive steps and motor speed for the operation shown in FIG. 9(a).

DESCRIPTION OF THE PREFERRED EMBODIMENT

The present invention will be described in detail with respect a preferred embodiment thereof with reference to the accompanying drawings.

Figure 1:
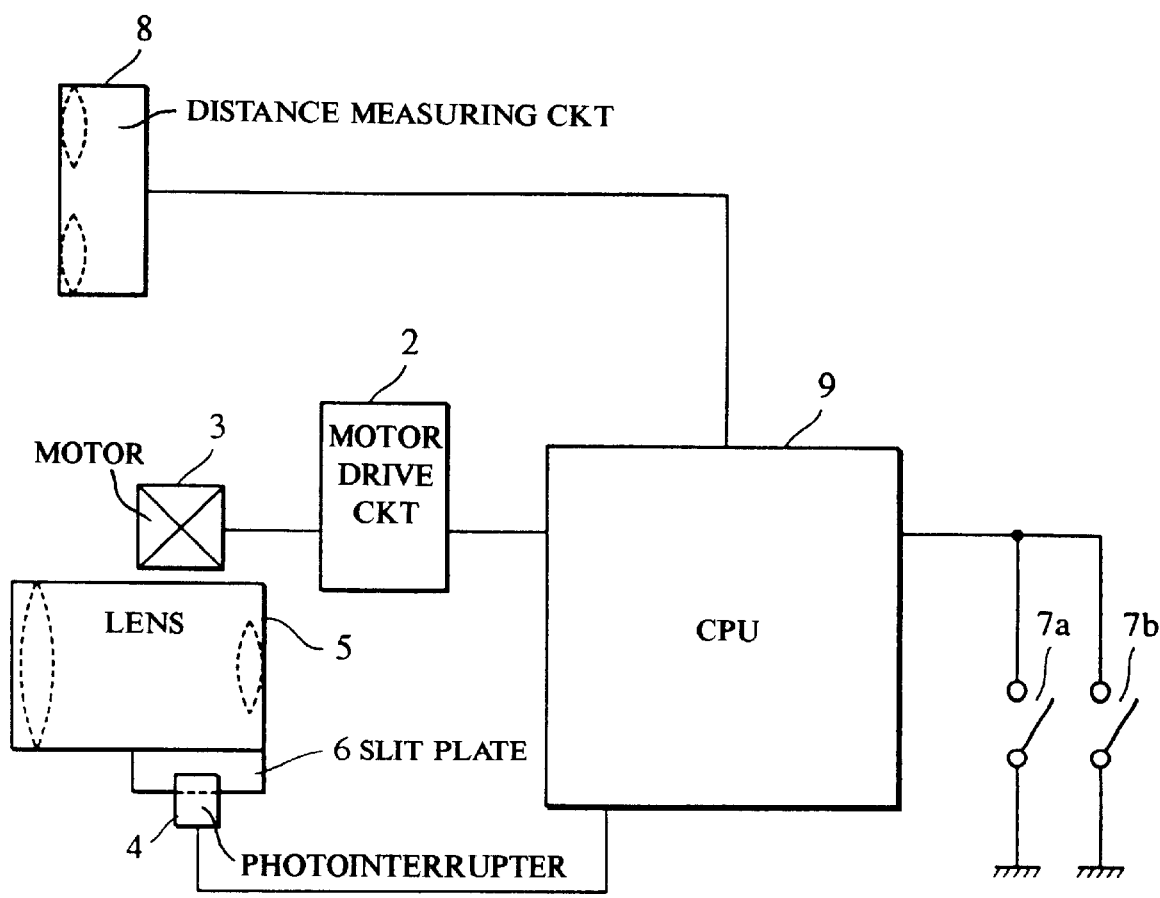
FIG. 1 is a block diagram of a configuration of a camera having an apparatus in accordance with an embodiment of the present invention.
Figure 5:
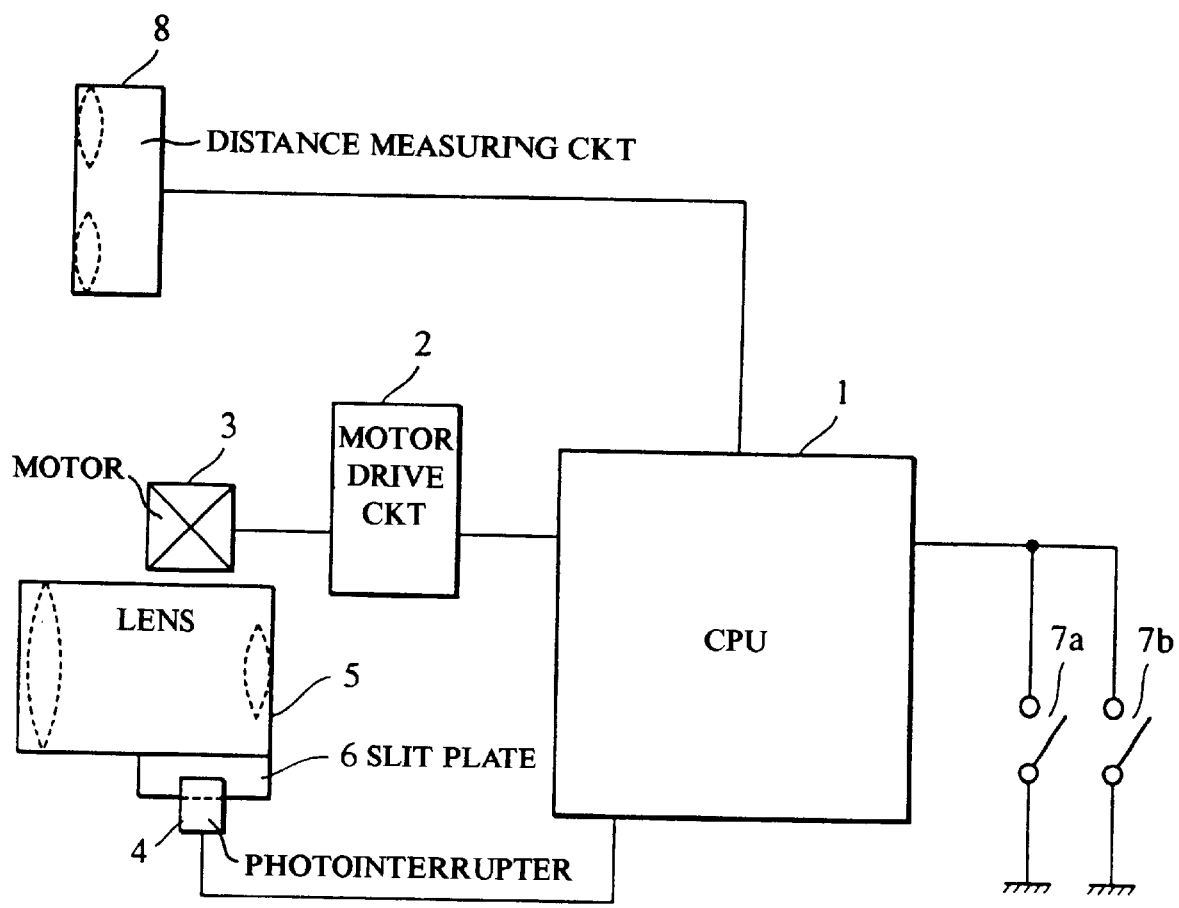
FIG. 5 is a block diagram of configuration of a conventional camera.
Figure 6A:
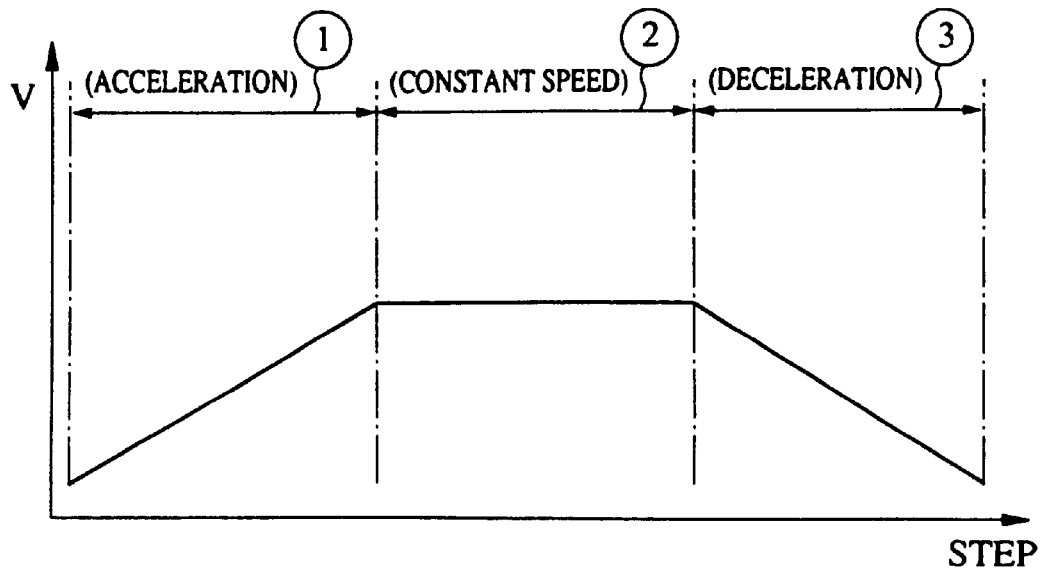
FIG. 6(a) is a diagram showing the relationship between the number of drive steps and motor speed for the operation of driving a lens with an ordinary stepping motor.
Figure 6B:
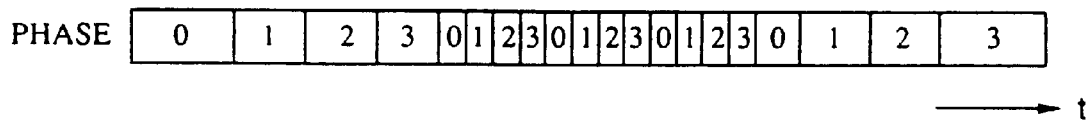
FIG. 6(b) is a diagram showing the relationship between drive time and motor pulse for the operation shown in FIG. 6(a)
Figure 7:
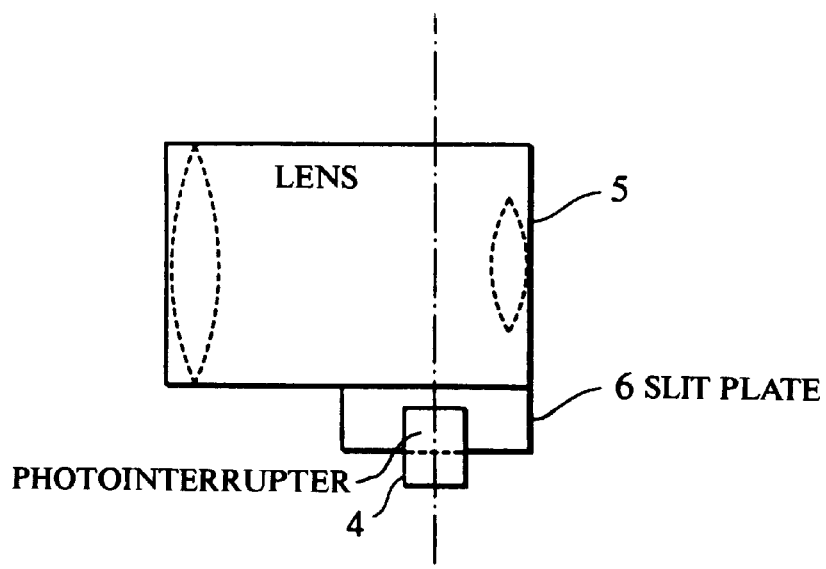
FIG. 7 is a diagram of the focusing lens in an initial position.

FIG. 1 is a block diagram showing the major components of a camera having a lens position controller in accordance with an embodiment of the present invention. Components 2 to 6, 7a, 7b, and 8 shown in FIG. 1 have the same functions as those indicated by the corresponding reference characters in FIG. 5.

Basic functions of a CPU 9 in the system shown in FIG. 1 are as described below. When a shutter release button is moved through its first half stroke to turn on the switch 7a, the CPU 9 drives the distance measuring circuit 8 to obtain distance measurement information, calculates the amount of driving of the focusing lens 5 from the distance measurement result, and drives the stepping motor 3 by the calculated driving amount through the motor drive circuit 2 to move the focusing lens 5 to a desired position.

Thereafter, when the release switch 7b is turned on by a second half stroke of the release button, the CPU 9 performs an exposure operation by a shutter control. After the completion of the exposure operation, the focusing lens 5 is returned to an position corresponding to a movement determination position. That is, the CPU 9 drives the stepping motor 3 a certain number of steps in the opposite direction through the motor drive circuit 2 to set the focusing lens 5 in the initial position.

The operation of the CPU 9 of this embodiment when the focusing lens 5 is set in the initial position will next be described.

As described above, if the position of the focusing lens 5 is in the vicinity of the initial position, as shown in FIG. 9(a), when the exposure operation is completed, and if the focusing lens 5 is driven directly from this position toward the initial position, the initial position detection time when the state of the photointerrupter 4 is changed from "bright" to "dark" will be in the period of the acceleration pattern ①, and the initial position detection time and the phase of the stepping motor 3 in setting the focusing lens 5 in the initial position vary due to a lag of the rotational speed of the stepping motor 3 with respect to the phase of the input to the motor 3, a lag of transmission of the rotation of the motor 3 and other factors.

To avoid such a situation, the focusing lens 5 is driven a number of steps equal to the sum of the numbers of steps for the acceleration pattern ① and the deceleration pattern ③ to be moved to a position indicated by the broken lines in FIG. 2(a). The relationship between the number of steps and the motor speed in this case is as shown in FIG. 2(b).

Thereafter, an initial position setting operation is performed in the above-described manner. The relationship between the focusing lens 5, the slit plate 6 and the photointerrupter 4 and the relationship between the number of steps and the speed during this operation are as shown in FIG. 3(a) and 3(b).

Figure 4:
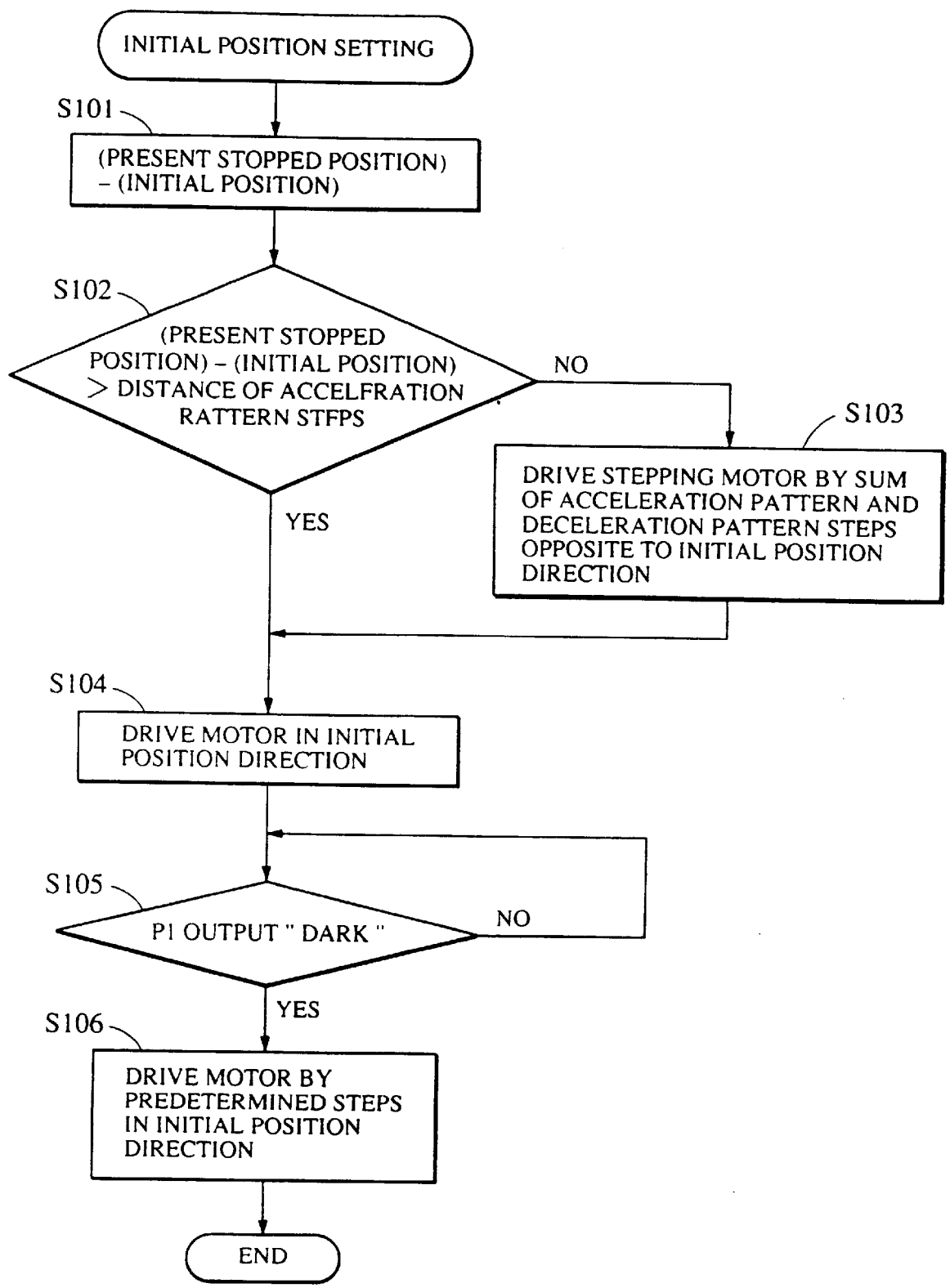
FIG. 4 is a flowchart of basic processing of the CPU shown in FIG. 1.

FIG. 4 is a flowchart of a part of a processing sequence of the CPU 9 for realizing the above-described operation.

When the initial position setting operation is started, the distance (the number of steps) between the present stopped position and the initial position is calculated in Step 101. In Step 102, the number of steps obtained in Step 101 and the number of steps for the acceleration pattern are compared. If, as a result of this comparison, the distance between the present stopped position and the initial position is larger than the distance defined by the number of steps for the acceleration pattern, the process moves to Step 104 to drive the stepping motor 3 in the direction of the initial position since it is not possible that the initial position detection time will be in the acceleration pattern ①.

On the other hand, if the distance between the present stopped position and the initial position is not larger than the distance defined by the number of steps for the acceleration pattern (as in the case shown in FIG. 2(a), the process moves to Step 103 to drive the stepping motor a number of steps equal to the sum of the numbers of steps for the acceleration pattern and the deceleration pattern in the direction opposite to the direction of the initial position. Then the process advances to Step 104 to drive the stepping motor 3 in the direction of the initial position.

Thereafter, in Step 105, a change in the state of the photointerrupter 4 from "bright" to "dark" is awaited. When this change is detected, the process advances to Step 106 to further drive the stepping motor 3 a predetermined number of steps (the number of steps for the deceleration pattern ③) in the direction of the initial position, thereby completing the process.

Consequently, the initial position detection time will necessarily be in the period of the constant speed pattern ② during the operation for setting the focusing lens 5 in the initial position. It is therefore possible to stabilize the initial position detection time and the phase of the stepping motor.

In the above-described embodiment, in a case where the initial position detection time is in the period of the acceleration pattern ① during the operation of driving the focusing lens 5 from the present position to the initial position, the focusing lens 5 is first driven a number of steps equal to the sum of the numbers of steps for the acceleration pattern ① and the deceleration pattern ③ in the direction opposite to the initial position setting direction, and is thereafter driven in the direction of the initial position. However, the arrangement may also be such that the focusing lens 5 is first driven at least the number of steps for the acceleration pattern ① and is thereafter driven in the direction of the initial position.

The present invention can be applied to any kinds of motor or driving means other than the stepping motor.

The present invention is not limited to the focusing lens and can also be applied to a lens system capable of changing the focal length, a zoom lens system a macro changeable lens system, and any other optical units.

Also, the present invention can be applied to various kinds of cameras, such as single-lens reflex cameras, leaf shutter cameras and video cameras, optical apparatuses other than cameras, any other kinds of apparatuses, and units for use in such cameras, optical apparatuses and other kinds of apparatuses.

The individual components shown in schematic or block form in the drawings are all well-known in the camera arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical drive comprising:
   a drive device which drives an optical unit; and
   a control device which determines a driving amount through which the drive device must drive the optical unit to reach a predetermined position, and controls a direction of movement of the optical unit driven by said drive device in accordance with the determined driving amount.

2. An optical unit controller according to claim 1, wherein said drive device includes a motor.

3. An optical unit controller according to claim 2, wherein said drive device includes a stepping motor.

4. An optical unit controller according to claim 1, wherein said determination means includes means for determining a movement of said optical unit to a predetermined position.

5. An optical unit controller according to claim 1, wherein said determination devices includes means for determining a movement to a predetermined position in the course of movement of said optical unit to an initial position.

6. An optical unit controller according to claim 1, wherein the optical unit has a position detecting means, and wherein said determination means includes means for detecting the position detection means, said detecting means being provided integrally on said optical unit.

7. An optical unit controller according to claim 1, wherein said control means includes means for moving said optical unit in a direction opposite to a direction toward the movement determination position if the amount of driving necessary for said drive device to move said optical unit to the movement determination position is smaller than the predetermined amount.

8. An optical unit controller according to claim 1, wherein said control means includes means for moving said optical unit in a direction opposite to a direction toward the movement determination position and thereafter moving said optical unit in the direction toward the movement determination position if the amount of driving necessary for said drive device to move said optical unit to the movement determination position is smaller than the predetermined amount.

9. An optical unit controller according to claim 1, wherein said control means includes means for moving said optical unit by a predetermined amount in a direction opposite to a direction toward the movement determination position and thereafter moving said optical unit in the direction toward the movement determination position if the amount of driving necessary for said drive device to move said optical unit to the movement determination position is smaller than the predetermined amount.

10. An optical unit controller according to claim 1, wherein said control device includes means for moving said optical unit in such a manner that if the amount of driving necessary for said drive means to move said optical unit to the movement determination position is smaller than the predetermined amount, said optical unit is moved in a direction opposite to a direction toward the movement determination position by a predetermined amount according to the amount of driving necessary for said drive means to move said optical unit to the movement determination position, and is thereafter moved in the direction toward the movement determination position.

11. An optical unit controller according to claim 1, wherein said control means includes means for moving said optical unit in such a manner that if the amount of driving necessary for said drive device to move said optical unit to the movement determination position is smaller than the predetermined amount necessary for stabilizing the driving state of said drive device, said optical unit is moved in a direction opposite to a direction toward the movement determination position until the amount of driving necessary for said drive unit to move said optical unit to the movement determination position becomes at least larger than the predetermined amount necessary for stabilizing the driving state of said drive means, and is thereafter moved in the direction toward the movement determination position.

12. An optical unit controller according to claim 1, wherein said control means includes means for moving said optical unit in such a manner that if the amount of driving necessary for said drive device to move said optical unit to the movement determination position is smaller than the predetermined amount necessary for exceeding an acceleration range of driving of said drive means, said optical unit is moved in a direction opposite to a direction toward the movement determination position until the amount of driving necessary for said device unit to move said optical unit to the movement determination position becomes at least larger than the predetermined amount necessary for exceeding the acceleration range of driving of said drive means, and is thereafter moved in the direction toward the movement determination position.

13. An optical unit controller according to claim 1, wherein said predetermined amount includes at least an amount necessary for driving of said drive device to exceed an acceleration range.

14. An optical unit controller according to claim 1, wherein said control means includes means for controlling driving of a motor.

15. An optical unit controller according to claim 1, wherein said control means includes means for stopping said optical unit at a predetermined position.

16. An optical unit controller according to claim 1, wherein said optical unit includes a lens.

17. An optical unit controller according to claim 1, wherein said optical unit includes means for focusing.

18. An optical drive apparatus according to claim 1, wherein said optical drive apparatus comprises a camera.

19. An optical drive apparatus according to claim 1 wherein said optical drive apparatus comprises an optical apparatus.

20. An optical drive apparatus comprising:

a drive device which drives an optical unit;

a control device which controls said drive device in such a manner that the optical unit reaches a predetermined position, said control device being constructed and arranged to control said drive device in such a manner that the optical unit is first moved by an amount in a direction away from said predetermined position and thereafter is driven in a direction toward the predetermined position.

21. An optical drive apparatus according to claim 20, wherein said drive device comprises a motor.

22. An optical drive apparatus according to claim 20, wherein said drive device comprises a stepping motor.

23. An optical drive apparatus according to claim 20, wherein said control device determines a reference position of the optical unit at the predetermined position.

24. An optical drive apparatus according to claim 20, wherein said control device determines a driving amount through which said drive device drives the optical unit to reach the predetermined position.

25. An optical drive apparatus according to claim 24, wherein said control device controls said drive device in such a manner that the optical unit moves a predetermined amount in the direction different from the direction toward the predetermined position in response to the predetermined driving amount.

26. An optical drive apparatus according to claim 20, wherein said control device controls said drive device in such a manner that the optical unit moves a predetermined amount in the direction different from the direction toward the predetermined position.

27. An optical drive apparatus according to claim 20, wherein said drive device drives the optical unit for focusing.

28. An optical drive apparatus according to claim 20, wherein said optical drive apparatus comprises a camera.

29. An optical drive apparatus according to claim 20, wherein said optical drive apparatus comprises an optical apparatus.

30. An optical drive apparatus according to claim 20, further comprising:

said optical unit.

31. An optical drive apparatus according to claim 1, wherein said optical unit comprises a lens.

* * * * *

UNITED STATES PATENT AND TRADEMARK OFFICE
CERTIFICATE OF CORRECTION

PATENT NO. : 6,029,010
DATED : February 22, 2000
INVENTOR(S) : Hiroshi Miyanari

It is certified that error appears in the above-identified patent and that said Letters Patent is hereby corrected as shown below:

Column 1:
Line 15, "a" should be deleted.

Column 2:
Line 28, "FIG. 8(a)." should read --FIG. 8(b)--; and
Line 31, "photointerruptor" should read --photointerrupter--.

Column 3:
Line 24, "FIG. 2(a);" should read --FIG. 3(a);--;
Line 48, "position." should read --position; and--; and
Line 56, "respect" should read --respect to--.

Column 4:
Line 11, "an" should read --a--;
Line 42, "FIG. 3(a)" should read --FIGS. 3(a)--; and
Line 61, "FIG. 2(a)," should read --FIG. 2(a)),--.

Column 5:
Line 63, "claim 2," should read --claim 1,--; and
Line 66, "means" should read --device--.

Column 6:
Line 2, "devices" should read --device--;
Line 7, "means" (first occurrence) should read --device--;
Line 38, "means" should read --device--;
Line 43, "means" should read --device--; and
Line 67, "means" should read --device--.

UNITED STATES PATENT AND TRADEMARK OFFICE
CERTIFICATE OF CORRECTION

PATENT NO. : 6,029,010
DATED : February 22, 2000
INVENTOR(S) : Hiroshi Miyanari

It is certified that error appears in the above-identified patent and that said Letters Patent is hereby corrected as shown below:

Column 7:
Line 3, "device unit" should read --drive device--; and
Line 6, "means," should read --device,--.

Column 8:
Line 34, "Claim 1," should read --claim 20,--.

Signed and Sealed this

Nineteenth Day of June, 2001

*Attest:*

NICHOLAS P. GODICI
*Attesting Officer*     *Acting Director of the United States Patent and Trademark Office*